UNITED STATES PATENT OFFICE.

JOSEPH C. HECKMAN, OF AVALON BOROUGH, PENNSYLVANIA.

GAS-PURIFYING MATERIAL.

1,154,859. Specification of Letters Patent. Patented Sept. 28, 1915.

No Drawing. Application filed March 9, 1915. Serial No. 13,146.

*To all whom it may concern:*

Be it known that I, JOSEPH C. HECKMAN, a citizen of the United States, and residing in the borough of Avalon, in the county of Allegheny and State of Pennsylvania, have invented or discovered new and useful Improvements in Gas-Purifying Material, of which the following is a specification.

My invention consists in a new and improved material for the purification of gas and other purposes.

The gas, as it comes from the producers, is contaminated with hydrogen sulfid which must be removed before the gas it fit for use. The process of purifying the gas, now most commonly employed, consists in passing the same through a bed of suitable material which usually consists of iron borings or hydrated sesqui-oxid of iron mixed with shavings, sawdust or corncobs as a fluffing material, sufficient moisture being added to the mixture to cause adhesion between the fluffing substance and the cleansing substance. This results in a fluffy, spongy mass through which the gas is passed. The mass so formed is highly combustible and subject to spontaneous ignition and fires. Also the valuable by-products, such as sulfur, are difficult to recover from the spent mass, owing to the many contaminations due to the fluffing substance. Again the cost of the fluffing substance and the expense of properly mixing the same with the purifying substance is considerable and the mixed mass quickly becomes saturated and loses its porous quality and filtering efficiency.

My improved material consists in "granulated" blast furnace slag whose units or particles are permeated and covered with hydrated sesqui-oxid of iron deposited from coal mine water filtered through a bed of said slag. By "granulated slag" I mean slag formed by running the molten slag from a blast furnace into water whereby is formed a vesicular, brittle, friable and pumice-like mass in the form of units which preferably range in size roughly from about an inch in diameter down to pea size. This slag contains oxid of lime, silicia, alumina, and a small percentage of iron or manganese.

The coal mine water is impregnated with sulfate of iron. The coal mine water is passed or filtered through a bed of the "granulated" slag with the following result. The oxid of lime of the slag neutralizes the acids of the coal mine water forming hydrated sesqui-oxid of iron which saturates the pores of the slag particles and coats the exterior of the same. I thus obtain without mechanical mixing a combination of a fluffing substance, the slag, and a purifying substance, the hydrated sesqui-oxid of iron, in one operation and at a minimum expense inasmuch as I use a natural filtering process in which I treat one waste product with a second waste product and obtain a purifying material comprising the fluffing substance and the purifying substance ready to be loaded in the gas boxes without further treatment or working.

The advantages in using a slag base or fluffing substance are manifold. The mixture or combination is of vastly greater purifying capacity than that used in the present practice, and therefore a much larger volume of gas may be filtered through the same quantity of material than has heretofore been possible, thereby cheapening the cost of gas manufacture. Again the purifying mixture does not become soggy or lose its fluffed, porous structure. The mixture or combination is non-combustible and danger or fire is avoided. The sulfur deposited from the gas forms with the slag sulfur pyrites of great commercial value from which the sulfur may be readily and cheaply recovered in a pure state. The purifying mixture is also more lasting than those now in use.

My method of combining the purifying substance with the base or fluffing substance forms a better combination than can be produced by mechanical mixing as the purifying substance permeates and saturates the peculiar porous structure of the slag so that the gas passing through the mass is brought into intimate contact with the purifying material.

My above described substance is valuable for many other purposes in addition to gas purification. Thus it may be used for an agricultural fertilizer or as a paint pigment. An analysis of the product has proven that it contains ingredients which make it a high class fertilizer.

What I desire to claim is:—

1. A new product of manufacture consisting of "granulated" blast furnace slag permeated with hydrated sesqui-oxid of iron.

2. A new product of manufacture produced by passing coal mine water through a bed of "granulated" blast furnace slag.

3. A new product of manufacture produced by passing coal mine water through a bed of blast furnace slag, whereby the sulfid of iron in the water combines with the oxid of lime in the slag to form hydrated sesqui-oxid of iron deposited in the pores of the slag.

Signed at Pittsburgh, Penna., this 8th day of March, 1915.

JOSEPH C. HECKMAN

Witnesses:
SYLVESTER J. SNEE,
E. A. LAWRENCE.